Oct. 2, 1923.
N. A. PETRY
1,469,686
CUT-OUT MECHANISM
Original Filed April 10, 1917
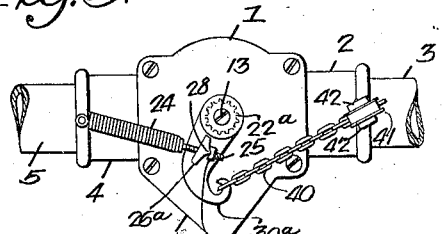
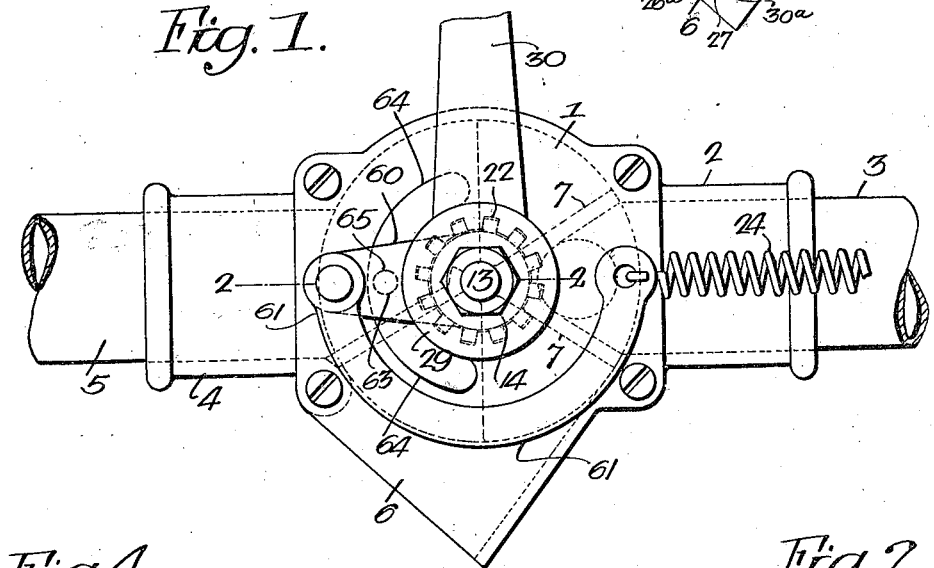
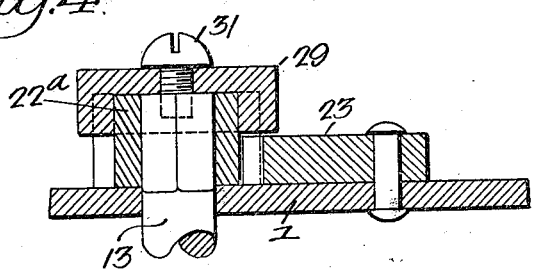
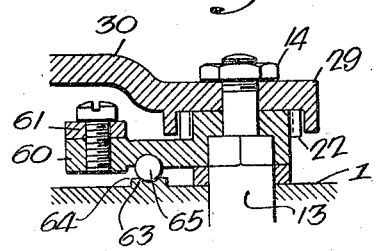
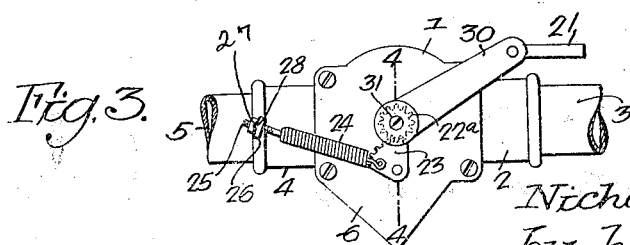
Inventor.
Nicholas A. Petry.
by his Attorneys
Howson & Howson Patented Oct. 2, 1923.

1,469,686

UNITED STATES PATENT OFFICE.

NICHOLAS A. PETRY, OF PHILADELPHIA, PENNSYLVANIA.

CUT-OUT MECHANISM.

Original application filed April 10, 1917, Serial No. 161,009. Divided and this application filed April 24, 1920. Serial No. 376,225.

*To all whom it may concern:*

Be it known that I, NICHOLAS A. PETRY, a citizen of the United States, residing in Philadelphia, Pennsylvania, have invented the Cut-Out Mechanism (being a division of my application filed April 10, 1917, Serial No. 161,009), of which the following is a specification.

One object of my invention is to so construct the operating mechanism of a muffler cut-out that it may be quickly and positively moved to any of its positions by means of a treadle, the connection between the treadle or other actuating member and the cut-out valve being likewise of novel construction.

A further object of the invention is to provide novel adjusting means for the operating mechanism of a muffler cut out whereby any variation in length or position of the operating rod or chain or difference in the line of thrust of the rod may be compensated for.

These objects and other advantageous ends I attain as hereinafter set forth, reference being had to the accompanying drawings, in which, Fig. 1 is a side elevation of a muffler cut out; showing my invention as applied thereto;

Fig. 2 is a vertical section on the line 2—2, Fig. 1, further illustrating the invention, the operating arm being illustrated as displaced from the position shown in Fig. 1;

Fig. 3 is a side elevation of a modified form of the invention;

Fig. 4 is an enlarged transverse section on the line 4—4, Fig. 3; and

Fig. 5 is an elevation of another form of my invention showing the operating devices adapted to be actuated by a pull chain cut out such as that described in my Patent #1,339,284 dated May 4, 1920, having an inlet branch 2 connected to the exhaust conduit 3 of an internal combustion engine and also provided with a branch 4 connected to a pipe 5 leading to a muffler. Said casing further has a cut out exhaust port 6 opening directly to the air.

Within the casing or valve chamber 1 is a movable valve member indicated in dotted lines at 7 fixed to a spindle 13 and capable of being moved thereby into any of several positions in one of which it permits the flow of gases from the pipe 3 through the casing 1 into the pipe 5. In another possible position said valve or movable member directly connects the pipe 3 through the casing 1 with the cut out exhaust port 6 while cutting off the entrance to the muffler pipe 5.

In that form of my invention shown in Fig. 1, I mount on the squared end of the valve spindle 13 an arm 60 whose outer end is connected through a semi-circular link 61 with one end of a spring 24 whose other end is connected to any suitable support. Said arm 60 has connected to or formed integral with it a toothed structure 22 operatively connected to an actuating arm 30 by an internally toothed cap 29.

With such an arrangement of parts the spring 24 will act through the link 61 to tend to hold the arm 60 and hence the parts attached thereto on one or the other side of the mid position or dead point at which said parts are shown, so that the movable valve member 7 occupies or tends to remain in either of its two extreme positions, in one of which as above noted the pipe 3 communicates with the pipe 5 and in the other of which said pipe 3 discharges directly into the exhaust port 6.

In order that the movable valve member may also be capable of remaining in the mid position illustrated, I provide a socket 63, Fig. 2, on the valve casing, with a circular track 64 on either side thereof and mount a ball or other retaining device 65 in a suitable recess formed in the under side of the arm 60 so that it may roll on the track and when brought into said socket 63, releasably hold the various parts in the intermediate position shown.

The cap 29 is held in position on the spindle 13 by a nut 14 and may be removed to change the angular position of this arm relatively to the arm 60. For this purpose the teeth of said cap may be disengaged from those of the toothed structure 22 and after the arm 30 has been brought to the desired angular position, the parts may again be brought into engagement and held in place by the nut 14 as before.

In that form of my invention shown in Figs. 3 and 4, I form the projecting end of the valve stem 13 with a squared head and upon this mount a spur pinion or other suitable toothed structure 22ª. This meshes with a second toothed structure in the form of a segment 23 pivoted to the outer face of the casing 1 and having attached to it one end of a coil spring 24. The other end of this spring is tightly wrapped about or otherwise secured to a screw stem 25 which passes through a projecting lug 26 formed integral with or otherwise rigidly mounted upon the casing 5 and is engaged by a nut 27 whereby the tension of said spring may be adjusted at will.

In order to prevent accidental loosening of the nut, 27, I form in its inner face notches which receive a projection 28 formed upon the outer face of the lug 26. By making the inner faces of the notches as shown at a wider angle than that of the outer faces of the lug and causing this to engage the nut at diametrically opposite points with the opening through the lug 26 of greater diameter than that of the screw stem 25, I also provide a pivotal mounting for the nut on which it may rock as the line of pull upon the screw stem 25 changes with the movement of the segment 23 from one position to another.

The spur pinion or toothed structure $22^a$ extends considerably beyond the outer face of the segment 23 and on this extended portion I mount a cap 29 which is internally toothed for engagement with the teeth of said pinion. Projecting from and forming part of this cap is an arm 30 to whose outer end is connected in this case a push rod 21. To accommodate variations in the length of this rod, the cap 29 and the arm 30 before being finally connected are lifted from the outer end of the pinion and adjusted thereon to the required position, after which the cap 29 may be retained in place on the outer end of the valve stem by means of a screw 31.

The action of the spring 24 at all times tends to hold the parts in the position shown in Fig. 3 at which time the movable valve member connected to the spindle 13 occupies the position in which the pipe 3 is connected to the pipe 5. When the arm 30 has been swung to the left by power applied to the rod 21 through an angle of about 90 deg. the valve member is moved to a position in which the pipe 3 is put in communication with the cut out exhaust port 6.

In Fig. 5, I have illustrated a form of operating mechanism by means of which the valve member may be operated through the medium of a pull chain or cable 40. In this case I attach the cable to the outer end of an arm $30^a$ and have it pass over a pulley 41 mounted upon lugs 42 integral with and projecting from the outer end of the casing enclosing the inlet port 6. In this case, I reverse the spring 24, fastening one end of it to a pin or lug projecting from the outer end of the casing of the exhaust port 7 and have the screw stem 25 pass through an opening in a lug $26^a$ formed upon the outer face of the arm $30^a$. This lug $26^a$ is provided with the projection 28 which engages with the notches in the adjusting nut 27.

I claim:

1. In a valve operating device, the combination of a valve stem; an operating arm mounted upon the valve stem; and a coil spring operative on said arm and terminating in a screw stem; a lug through which the stem passes; a projection on said lug; and a nut engaging the screw stem and normally held from turning by said projection.

2. In a valve operating device, the combination of a valve stem; an operating arm mounted upon the valve stem; and adjustable yielding means whereby said arm is normally maintained in one extreme position, said means comprising a coiled spring terminating in a screw stem, a lug through which the screw stem passes, a projection on said lug, and a notched nut engaging the screw stem, the notches on said nut receiving the projection on said lug.

3. In a valve operating device, the combination of a valve stem; an operating arm mounted upon the valve stem; a coiled spring operative on the arm and terminating in a screw stem; a lug through which the screw stem passes; a projection on said lug; and a notched nut engaging the screw stem; the notches in said nut receiving the projection on said lug, and the sides of the notches being at a wider angle than the sides of the lugs, whereby a pivotal bearing is formed upon which the nut may rock when the line of pull upon the screw stem is changed.

4. The combination in a valve operating device of a valve stem; an arm fixed to said stem and including an integral projecting lug having a bearing projection; a spring; a threaded stem connected to said spring; a nut on said stem having notches positioned to cooperate with said projection on the lug; and operating means connected to said arm for moving it in opposition to the spring.

NICHOLAS A. PETRY.